(12) United States Patent
Abe

(10) Patent No.: US 6,208,754 B1
(45) Date of Patent: *Mar. 27, 2001

(54) IMAGE COMPRESSION AND EXPANSION DEVICE USING PIXEL OFFSET

(75) Inventor: Nobuaki Abe, Hokkaido (JP)

(73) Assignee: Asahi Kogaku Kogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/919,341

(22) Filed: Aug. 28, 1997

(30) Foreign Application Priority Data

Aug. 29, 1996 (JP) ................................... 8-247257

(51) Int. Cl.[7] .................. G06K 9/00; G06K 9/36
(52) U.S. Cl. ................... 382/166; 382/167; 382/250
(58) Field of Search .................. 382/166, 232, 382/248, 250, 251, 305, 167; 358/261.3, 432, 433, 539, 427; 348/568, 391, 393, 395, 403, 599, 450, 453, 717, 668, 669, 702; 345/202, 153, 154

(56) References Cited

U.S. PATENT DOCUMENTS

| 4,825,291 | * | 4/1989 | Mimura et al. | 348/220 |
|---|---|---|---|---|
| 4,979,049 | * | 12/1990 | Chamzas et al. | 358/426 |
| 5,051,929 | * | 9/1991 | Tutt et al. | 345/431 |
| 5,341,318 | * | 8/1994 | Balkanski et al. | 358/426 |
| 5,374,957 | * | 12/1994 | Sharma | 348/391 |
| 5,488,687 | * | 1/1996 | Rich | 345/508 |
| 5,497,246 |  | 3/1996 | Abe | 358/426 |
| 5,666,209 |  | 9/1997 | Abe | 386/109 |
| 5,740,345 | * | 4/1998 | Danielson et al. | 345/431 |
| 5,796,873 | * | 8/1998 | Deane | 382/254 |
| 5,818,525 | * | 10/1998 | Elabd | 348/268 |

FOREIGN PATENT DOCUMENTS 7135568  11/1994  (JP) ................................ H04N/1/41

* cited by examiner

Primary Examiner—Amelia Au
Assistant Examiner—Timothy M. Johnson
(74) Attorney, Agent, or Firm—Greenblum & Bernstein, P.L.C.

(57) ABSTRACT

The image compression and expansion device handles red (R), green (G) and blue (B) image data, which are offset horizontally to each other by one-third of one pixel, for example. The R, G and B image data are converted to a luminance signal and color difference signals, which are compressed according to the JPEG algorithm to generate compressed image data. The compressed image data are then recorded in a recording medium. Offset information, indicating that the R, G and B image data are offset to each other, is converted to a predetermined format, and is also recorded in the recording medium.

9 Claims, 4 Drawing Sheets

IMAGE COMPRESSION AND EXPANSION DEVICE USING PIXEL OFFSET

BACKGROUND OF THE INVENTION

1. Field of the Invention

The present invention is related to a device which compresses color still image data, for example, in accordance with a JPEG (Joint Photographic Expert Group) algorithm and records the compressed image data in a recording medium and, also, to a device which reads the compressed image data from the recording medium and expands the compressed image data to reproduce the color still image.

2. Description of the Related Art

A standard algorithm, for the encoding of high resolution images and the transfer of that information through telecommunication transmission channels, has been recommended by the JPEG. In order to enable a large-scale data compression, the baseline process of the JPEG algorithm breaks down the original image data into components on a spatial frequency axis using a two-dimensional DCT process. Thereafter, the data expressed on the spatial frequency axis is quantized by using a quantization table. The quantized data is then encoded using a Huffman table.

There is known a so-called pixel offset method, in which, for example, one color still image is color-separated into red, green and blue images. These three images are then offset with respect to each other, by, for example, one-third of one pixel in a horizontal direction, as they are formed on an imaging device. According to the pixel offset method, a high definition image can be obtained, because the pixel data are now obtained for every one-third of a pixel.

In a conventional device, when compressing the image data, which are obtained by using the pixel offset method, according to the JPEG, as a pre-stage of the image process, a high definition image is initially generated using all of the color pixel data obtained by the pixel offset method, and then, a compression process is carried out on the high definition image. Therefore, the time it takes to record the compressed image data in a recording medium is extended, and the amount of the compressed data is large.

SUMMARY OF THE INVENTION

Accordingly, an object of the present invention is to provide an image compression device in which a recording operation, in which image data obtained by the pixel offset method are compressed and recorded in a recording medium, can be performed in a short time, and the amount of the compressed image data can be reduced.

According to the present invention, there is provided an image compression device comprising a pixel data input processor, a compressed image recording processor and an offset information recording processor.

The pixel data input processor inputs pixel data, which is contained in a plurality of image data, to the image compression device, the plurality of image data being offset to each other. The compressed image recording processor compresses the pixel data, while the plurality of image data remain offset to each other, to obtain compressed image data, and records the compressed image data in a recording medium. The offset information recording processor records offset information, indicating that the plurality of image data are offset to each other, in the recording medium.

Another object of the present invention is to provide an image expansion device which can reproduce the compressed image data obtained by the image compression device.

According to the present invention, there is provided an image expansion device which expands compressed image data recorded in a recording medium, in which offset information is also recorded, the device comprising an image reading processor, an information reading processor, a pixel data reproducing processor and an image generating processor.

The image reading processor reads the compressed image data from the recording medium. The information reading processor reads the offset information from the recording medium. The pixel data reproducing processor expands the compressed image data to reproduce pixel data corresponding to a plurality of image data which are offset to each other. The image generating processor executes a high definition process, based on the offset information, to the pixel data, so that one high definition image corresponding to the plurality of image data is obtained.

Further, according to the present invention, there is provided an image expansion device which expands compressed image data recorded in a recording medium, in which offset information is also recorded, the device comprising an image reading processor, an information reading processor, a signal reproducing processor, an image data reproducing processor and an image generating processor.

The image reading processor reads the compressed image data from the recording medium. The information reading processor reads the offset information from the recording medium. The signal reproducing processor expands the compressed image data to reproduce a luminance signal and color differential signals. The image data reproducing processor reproduces a plurality of image data, which comprise red, green and blue image data and are offset to each other, based on the luminance signal and the color differential signals. The image generating processor executes a high definition process, based on the offset information, to the plurality of image data, so that one high definition image corresponding to the plurality of image data is obtained.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
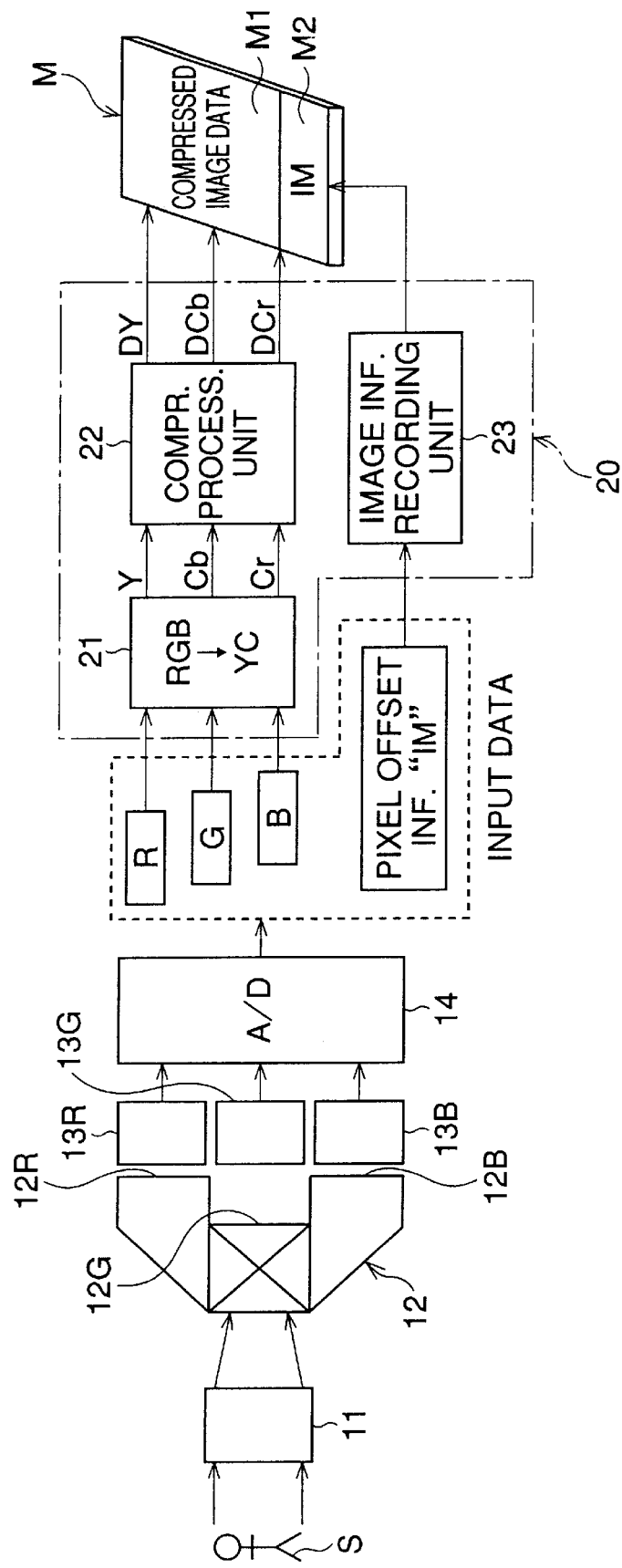
FIG. 1 is a block diagram showing an image compression device of an embodiment of the present invention.

The present invention will be described below with reference to embodiments shown in the drawings.

FIG. 1 is a block diagram of an image compression device of an embodiment of the present invention, by which luminance signals (Y data) and color difference signals (Cb data and Cr data), which correspond to an original color still image, are compressed according to the JPEG algorithm.

Light reflected from a subject S passes through an imaging optical system 11 and enters a dichroic prism 12, so that the light is color-separated into a red (R) light component, a green (G) light component and a blue (B) light component. These light components exit from emergent planes 12R, 12G and 12B, respectively, so that an R image, a G image and a B image, which correspond to a single object image, are formed on light receiving surfaces of CCDs (charge coupled device) 13R, 13G and 13B, respectively.

The CCDs 13R, 13G and 13B are offset in a horizontal direction, by one-third of one pixel with respect to each other, relative to the corresponding optical axis passing through the emergent planes 12R, 12G and 12B, respectively. Due to this pixel offset, a high quality image can be reproduced, as described below.

Each of the CCDs 13R, 13G and 13B produces charges, which are representative of the quantity of light incident thereon, and outputs an analog image signal. Each analog image signal is converted to a digital image signal by an A/D converter 14. Thus, the R image data, the G image data and the B image data are inputted into the image compression device 20, in a digital form, while the R, G and B image data remain offset by one-third of one pixel with respect to each other.

The R, G and B image data (i.e., the input data) are converted to luminance data Y and color difference data Cb and Cr in a signal processing unit 21. The luminance data Y and the color difference data Cb and Cr are compressed by an image processing device 22, in accordance with the JPEG algorithm, so that compressed image data DY, DCb and DCr are recorded in an image recording area M1 of a recording medium M, such as an IC memory card. Namely, the pixel data, which are contained in the R, G and B image data, are subjected to the compression process, while the R, G and B image data remain offset to each other, and are then recorded in the recording medium M.

Offset information IM is also inputted into the image compression device 20 together with the image data. The offset information IM indicates that the R, G and B image data are offset to each other by one-third of one pixel in the horizontal direction. The offset information IM is converted, by an image information recording processing unit 23, to data which are conformed to a predetermined format, and are recorded in an information recording area M2 of the recording medium M.

The compression process performed in the compression processing unit 22 is described below.

The luminance data Y is subjected to a two-dimensional discrete cosine transformation (two-dimensional DCT), so as to produce a DCT coefficient for each spatial frequency. The DCT coefficients of the luminance data Y are quantized using a quantization table, so that quantized DCT coefficients are obtained. The quantized DCT coefficients of the luminance data Y are encoded using a Huffman-encoding table, so that the quantized DCT coefficients are converted to compressed image data DY.

In the same way as the above, the color difference data Cb and Cr are converted to DCT coefficients, and are then quantized to produce quantized DCT coefficients. The quantized DCT coefficients of the color difference data Cb, Cr are then converted to compressed image data DCb and DCr.

Regarding the R, G and B image data, the respective pixel data are divided into a plurality of blocks for one frame image, so that the luminance data Y and the color difference data Cb and Cr are processed for each block. Note that each of the blocks is composed of an 8×8 pixel data matrix.

Figure 2:
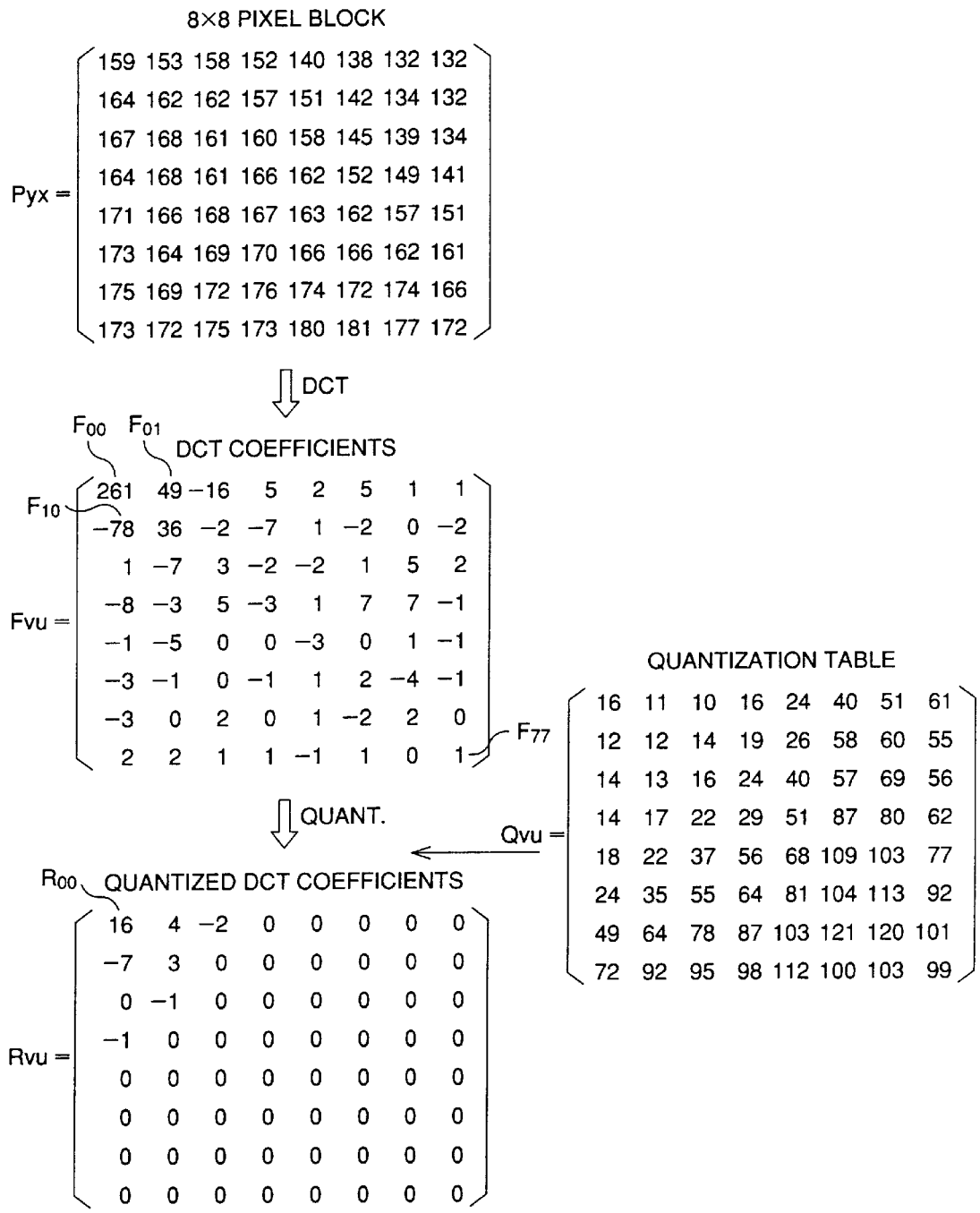
FIG. 2 is a view showing, as an example, pixel values Pyx of an 8×8 pixel block, DCT coefficients Fvu, quantized DCT coefficients Rvu and a quantization table.

FIG. 2 shows, as an example, pixel values Pyx of an 8×8 pixel block, DCT coefficients Fvu, quantized DCT coefficients Rvu and a quantization table. The suffix "y" indicates the vertical position in the 8×8 pixel block. Values of "y" (0, 1, 2, . . . 7) ascend from the upper-position to the lower-position. The suffix "x" indicates the horizontal position in the 8×8 pixel block. Values of "x" (0, 1, 2, . . . 7) ascend from the left-position to the right-position. The suffixes "v" and "u" correspond to the vertical and horizontal positions of 64 DCT coefficients which are arranged in an 8×8 matrix. Values of "v" (0, 1, 2, . . . 7) ascend from the upper-position to the lower-position. Values of "u" (0, 1, 2, . . . 7) ascend from the left-position to the right-position.

The pixel values Pyx are converted to 64 (8×8) DCT coefficients Fvu by the two-dimensional DCT. The two-dimensional DCT is expressed by the following equation (1):

$$Fvu = \frac{1}{4} Cu\, Cv \sum_{y=0}^{7} \sum_{x=0}^{7} Pyx \cdot \cos(2x+1)\frac{u\Pi}{16} \cdot \cos(2y+1)\frac{v\Pi}{16} \quad (1)$$

$$\text{wherein } Cu,\ Cv = \frac{1}{\sqrt{2}} : u,\ v = 0$$
$$= 1 : u,\ v \neq 0$$

Of these DCT coefficients, the DCT coefficient $F_{00}$ at the position (0,0) is the DC (Direct Current) component, while remaining 63 DCT coefficients Fvu are the AC (Alternating Current) components. The AC components show how many higher spatial frequency components there are in the 8×8 pixel block of image data from the coefficients $F_{01}$ and $F_{10}$ to the coefficient $F_{77}$. The DC component shows the average value of the spatial frequency components of the 8×8 pixel block as a whole. Each DCT coefficient Fvu corresponds to a predetermined spatial frequency.

The quantization table is composed of 64 quantization coefficients Qvu. The equation for quantization of the DCT coefficients Fvu, using the quantization table, is defined as follows:

$$Rvu = \text{round}\ (Fvu/Qvu) \quad\quad (0 \leq u,\ v \leq 7)$$

The term "round", in this equation, is an approximation function which approximates, to the nearest integer, the value of the argument. Thus, if the argument is less than 0.5, the value is rounded down to the nearest integer. If the argument is greater than or equal to 0.5, the value is rounded up to the nearest integer. For example, the value 3.49 is rounded down to 3, whereas 3.50 is rounded up to 4. Namely, the quantized DCT coefficients Rvu, shown in FIG. 2, are obtained by dividing each of the DCT coefficients Fvu by the corresponding quantization coefficients Qvu, and rounding off.

The quantized DCT coefficients Rvu are subjected to the Huffman encoding and are recorded in the recording medium M. Since the Huffman encoding is well known, a detailed explanation thereof is omitted in this specification.

Figure 3:
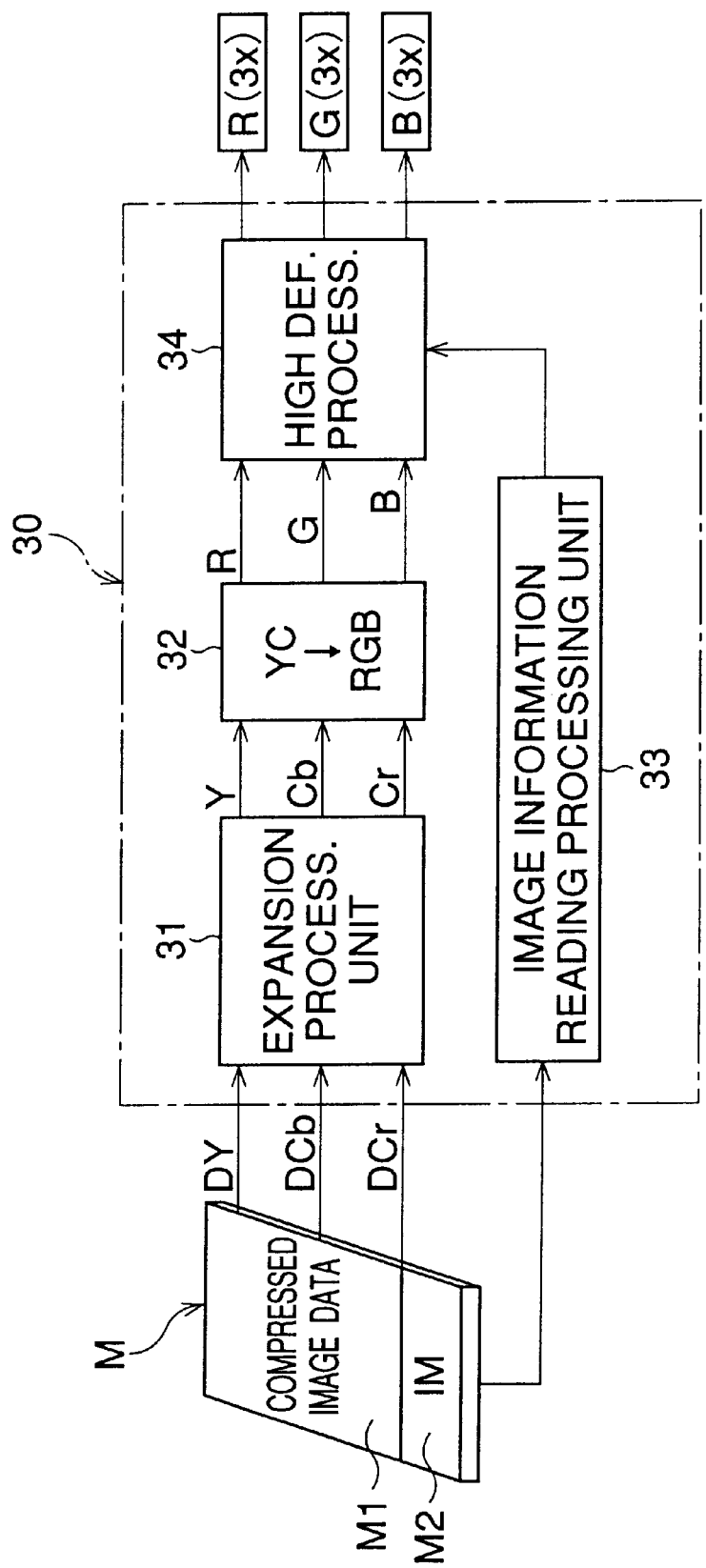
FIG. 3 is a block diagram showing an image expansion device of the embodiment.

FIG. 3 is a block diagram of an image expansion device 30 of the embodiment of the present invention.

The compressed image data DY, DCb and DCr read from the recording medium M are decoded, in an expansion processing unit 31, and are converted to the quantized DCT coefficients of the luminance data Y and the color difference data Cb and Cr. The decoding is the inverse of the Huffman encoding, which is well known. The quantized DCT coefficients obtained by the decoding are dequantized, using the quantization table, so that the quantized DCT coefficients are converted back to the DCT coefficients. These DCT coefficients are then subjected to a two-dimensional inverse discrete cosine transformation (two-dimensional IDCT), so that the luminance data Y and the color difference data Cb and Cr are reproduced. The luminance data Y and the color difference data Cb and Cr are processed in a data inverse transformation processing unit 32, so that the luminance data Y and the color difference data Cb and Cr are converted to the R, G and B image data. The processes that occur in the expansion processing unit 31 and in the data inverse transformation processing unit 32 are well known.

Each of the pixel data contained in the R, G and B image data, outputted from the data inverse transformation processing unit 32, are in the same positional state as that in which the pixel data was inputted into the signal processing unit 21 of the image compression device 20, i.e., in a state in which the R, G and B images are still offset to each other by one-third of one pixel.

The offset information IM read from the recording medium M is converted, in an image information reading processing unit 33, to data which are conformed to a predetermined format. Then, the offset information IM is inputted into a high definition processing unit 34, together with the R, G and B image data outputted from the data inverted transformation processing unit 32.

Figure 4:
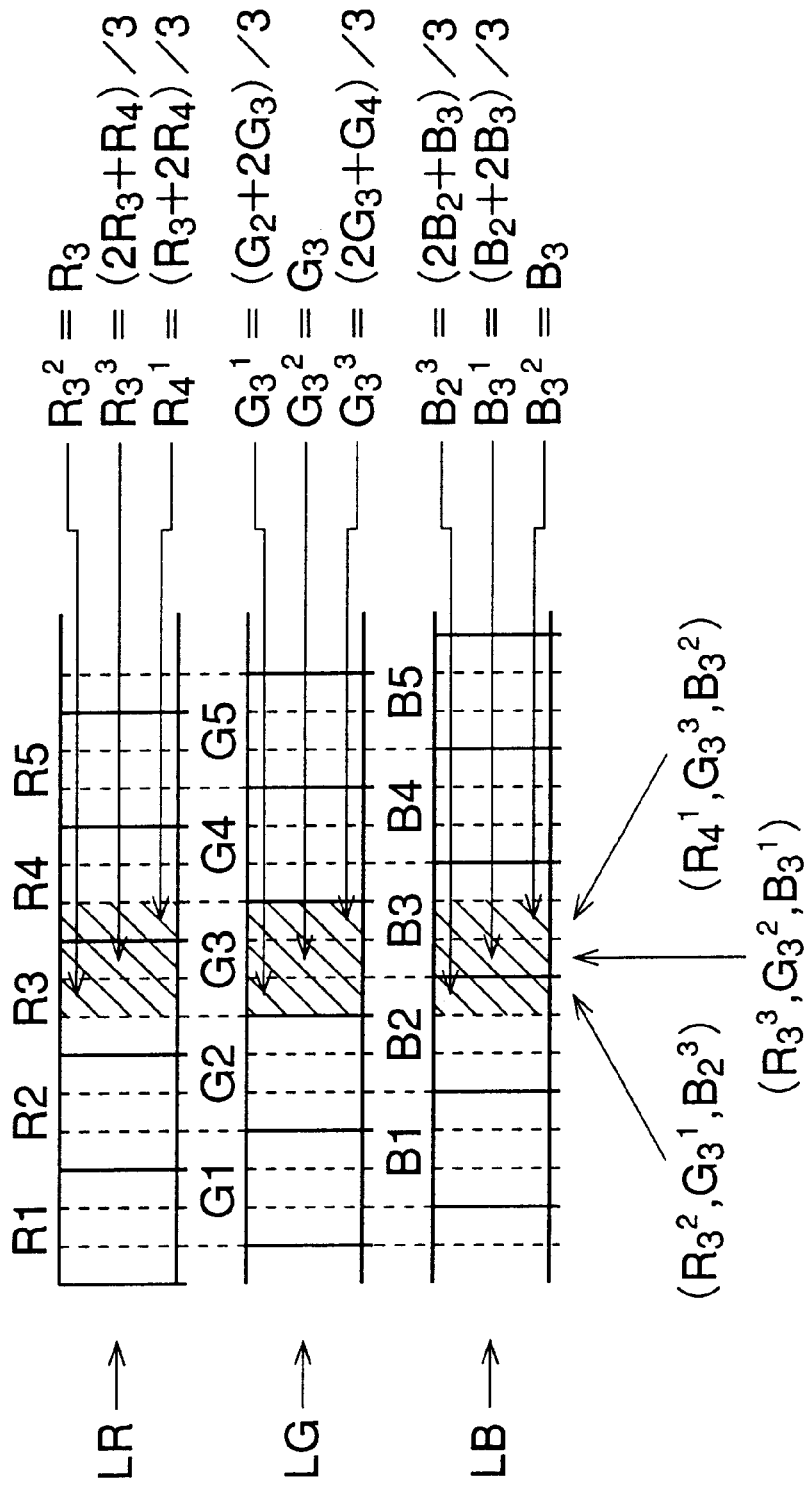
FIG. 4 is a view showing pixel data obtained by a pixel offset method.

A high definition process performed in the high definition processing unit 34 is described below, with reference to FIG. 4. In FIG. 4, pixel signals outputted from the CCDs 13R, 13G and 13B are shown, and each of the references LR, LG and LB indicates a horizontal scanning line of the R image, the G image and the B image, respectively. The pixel values, denoted by a subscript of the suffix, obtained by the photodiodes corresponding to the respective pixels, for example, are $R_1$ through $R_5$, $G_1$ through $G_5$ and $B_1$ through B5. Further, as each pixel is horizontally divided into three parts, a distinction is made whereby a superscript "1" is added to the pixel value of theleft part, a superscript "2" is added to the pixel value of the center part, and a superscript "3" is added to the pixel value of the right part.

A pixel of the G image is offset, relative to the corresponding pixel of the R image, to the right side by one-third of one pixel, and a pixel of the B image is offset, relative to the corresponding pixel of the G image, to the right side by one-third of one pixel. As hatched in the drawing, a pixel $G_3$ of the G image corresponds to a central part $R_3^2$ and a right part $R_3^3$ of the corresponding pixel $R_3$, and a left part $R_4^1$ of the corresponding pixel $R_4$ of the R image. Further, the pixel $G_3$ corresponds to a right part $B_2^3$ of the corresponding pixel $B_2$ and a left part $B_3^1$ and a central part $B_3^2$ of the corresponding pixel $B_3$ of the B image.

In each pixel, the left part is influenced by the pixel of the same color image immediately to the left side, and the right part is influenced by the pixel of the same color image immediately to the right side. The center part is not influenced by either of the pixels positioned at the opposing sides. Accordingly, the pixel value of the left part in the pixel $G_3$ can be expressed as follows:

$$G_3^1=(G_2+2G_3)/3$$

The pixel value of the center part can be expressed as follows:

$$G_3^2=G_3$$

The pixel value of the right part can be expressed as follows:

$$G_3^3=(2G_3+G_4)/3$$

The pixel value of the center part of the pixel $R_3$ can be expressed as follows:

$$R_3^2=R_3$$

The pixel value of the right part can be expressed as follows:

$$R_3^3=(2R_3+R_4)/3$$

The pixel value of the left part of the pixel $R_4$ can be expressed as follows:

$$R_4=(R_3+2R_4)/3$$

The pixel value of the right part of the pixel $B_2$ can be expressed as follows:

$$B_2^3=(2B_2+B_3)/3$$

The pixel value of the left part of the pixel $B_3$ can be expressed as follows:

$$B_3^1=(B_2+2B_3)/3$$

The pixel value of the center part can be expressed as follows:

$$B_3^2=B_3$$

According to this offset pixel method, one pixel is divided into three parts, so that each of the parts can be given a different pixel value. In other words, an equivalent effect to that in which the number of pixels are increased by three times, can be obtained by the offset pixel method, whereby a high definition image can be obtained.

As described above, in the embodiment, the R, G and B image data obtained by the offset pixel method are subjected to a compression process, while the R, G and B image data remain offset to each other, and are then recorded in the recording medium M. Subsequently, the image data, while retaining the offset condition, are reproduced, and then, the high definition process is performed to the image data so that a high definition image is obtained. Namely, the high definition process is not carried out prior to or during the image data being recorded in the recording medium M. Therefore, in comparison with a conventional device, a recording operation, in which image data are compressed and recorded in the recording medium M, can be performed in a short time.

Note that the amount of offset in the offset pixel method if not restricted to one-third, but various values can be applied.

Further note that, as a method of image compression, an image compression other than that which uses the JPEG algorithm can be applied.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 8-247257 (filed on Aug. 29, 1996) which is expressly incorporated herein by reference, in its entirety.

What is claimed is:

1. An image compression device, comprising:

a plurality of image devices that generate a plurality of image data based on a single image, such that each of the plurality of image data is at a lower resolution than the single image;

a pixel data input processor that inputs pixel data contained in said plurality of image data to said image compression device, said plurality of image data being offset with respect to each other;

a compressed image recording processor that compresses said pixel data, while said plurality of image data remain offset to each other to obtain compressed image data, and records said compressed image, data in a recording medium prior to processing to obtain a high definition image wherein the high definition image is at a resolution greater than each of said plurality of image data; and an offset information recording processor that records offset information, indicating that said plurality of image data are offset with respect to each other, in said recording medium.

2. A device according to claim 1, wherein said plurality of image data correspond to a single object image, and comprise red image data, green image data and blue image data.

3. A device according to claim 2, wherein said pixel data are inputted to said image compression device while said red image data, said green image data and said blue image data remain offset to each other by one-third of one pixel.

4. A device according to claim 2, wherein said compressed image recording processor converts said pixel data, having said red image data, said green image data and said blue image data, to a luminance signal and a color difference signal, and compresses said luminance signal and said color difference signal.

5. A device according to claim 1, wherein said image data comprises pixel data which are arranged in a matrix, and said compressed image recording processor processes said pixel data, using a two-dimensional discrete cosine transformation (two-dimensional DCT), to obtain a DCT coefficient for every spatial frequency, quantizes said DCT coefficients by a quantization table composed of predetermined quantization coefficients to obtain quantized DCT coefficients, and processes said quantized DCT coefficient using a Huffman encoding.

6. A device according to claim 1, wherein said recording medium has an image recording area, in which said compressed image data is recorded, and an information recording area, in which said offset information is recorded.

7. The device according to claim 1, wherein the offset information recorded in said offset information recording processor includes an amount of offset that the plurality of image data are offset with respect to each other.

8. An image expansion device which expands compressed image data recorded in a recording medium, in which offset information is also recorded, said device comprising:

an image reading processor that reads said compressed image data from said recording medium;

an information reading processor that reads said offset information from said recording medium;

a pixel data reproducing processor that expands said compressed image data to reproduce a plurality of pixel data corresponding to a plurality of image data, each of said plurality of pixel data being offset with respect to each other, wherein said plurality of image data represents a single image, such that each of the plurality of image data is at a lower resolution than the single image; and an image generating processor that processes the reproduced plurality of pixel data, which are offset with respect to each other, and removes the offset, so that one high definition image corresponding to said plurality of image data is obtained, the high definition image having a resolution greater than a resolution of each of the plurality of image data.

9. An image expansion device which expands compressed image data recorded in a recording medium, in which offset information is also recorded, said device comprising:

an image reading processor that reads said compressed image data from said recording medium;

an information reading processor that reads said offset information from said recording medium;

a signal reproducing processor that expands said compressed image data to reproduce a luminance signal and a color differential signal; and an image data reproducing processor that reproduces a plurality of image data, said plurality of image data representing a single image, such that each of said plurality of image data is at a lower resolution than the single image, and comprising red image data, green image data and blue image data, each of which are offset with respect to each other, based on said luminance signal and said color differential signal; and an image generating processor that processes the reproduced plurality of image data, each of which are offset with respect to each other, and removes the offset, so that one high definition image corresponding to said plurality of image data is obtained, the high definition image having a resolution greater than a resolution of each of the plurality of image data.

* * * * *